United States Patent
Torgersrud et al.

(10) Patent No.: US 10,726,365 B2
(45) Date of Patent: Jul. 28, 2020

(54) SECURE FACILITY RESIDENT GRIEVANCE/REQUEST FILING SYSTEM

(71) Applicant: Telmate, LLC, San Francisco, CA (US)

(72) Inventors: Richard Torgersrud, San Francisco, CA (US); Christopher Ditto, San Jose, CA (US)

(73) Assignee: Intelmate LLC, San Francisco, CA (US)

( * ) Notice: Subject to any disclaimer, the term of this patent is extended or adjusted under 35 U.S.C. 154(b) by 1052 days.

(21) Appl. No.: 14/477,658

(22) Filed: Sep. 4, 2014

(65) Prior Publication Data

US 2015/0073843 A1 Mar. 12, 2015

Related U.S. Application Data

(60) Provisional application No. 61/874,960, filed on Sep. 6, 2013.

(51) Int. Cl.
*G06Q 10/06* (2012.01)
*G06Q 10/10* (2012.01)
*G06Q 50/26* (2012.01)

(52) U.S. Cl.
CPC ........ *G06Q 10/063* (2013.01); *G06Q 10/10* (2013.01); *G06Q 50/26* (2013.01)

(58) Field of Classification Search
None
See application file for complete search history.

(56) References Cited

U.S. PATENT DOCUMENTS

| | | | |
|---|---|---|---|
| 2002/0007283 A1* | 1/2002 | Anelli | G06Q 10/10 705/309 |
| 2003/0216938 A1* | 11/2003 | Shour | G06F 19/324 705/2 |
| 2004/0116115 A1* | 6/2004 | Ertel | H04W 4/00 455/426.2 |
| 2005/0203792 A1* | 9/2005 | Kuppe | G06Q 10/10 705/7.38 |
| 2006/0059151 A1* | 3/2006 | Martinez | G06F 16/35 |

* cited by examiner

*Primary Examiner* — Eric W Stamber
*Assistant Examiner* — Ashley Y Young
(74) *Attorney, Agent, or Firm* — Ferguson Braswell Fraser Kubasta PC

(57) ABSTRACT

An exemplary embodiment provides for a computer-implemented method for processing a secure facility resident request. The method includes accepting a request type selection by the secure facility resident, providing a request form corresponding to the request type, accepting input for the request form and routing the request form to secure facility staff for review. The method additionally includes routing the request form back to the secure facility resident if further information is required and if the further information is required, accepting the further information from the secure facility resident.

12 Claims, 13 Drawing Sheets

SECURE FACILITY RESIDENT GRIEVANCE/REQUEST FILING SYSTEM

CROSS-REFERENCE TO RELATED APPLICATIONS

This application hereby claims the benefit of priority of U.S. Provisional Patent Application Ser. No. 61/874,960, filed on Sep. 6, 2013, entitled "Automated Grievances," and is herein incorporated by reference.

BACKGROUND

Secure facilities, such as jails, prisons, detention centers and the like, often have programs in-place to formally handle special requests, grievances and other similar messages from residents in order for certain desired actions to occur.

While these programs may serve their respective services, they often come with downsides such as consuming facility staff time to process and track the requests. Some types of requests may also have legal ramifications if not acted upon in a timely manner. Some types of requests may also be required to be handled by third parties to ensure impartial handling which unto itself adds to the complexity of managing request programs.

Due to these deficiencies, and perhaps other ones, there is a need for improved facility request programs systems and methodologies.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

An exemplary embodiment provides for a computer-implemented method for processing a secure facility resident request. The method includes accepting a request type selection by the secure facility resident, providing a request form corresponding to the request type, accepting input for the request form and routing the request form to secure facility staff for review. The method additionally includes routing the request form back to the secure facility resident if further information is required and if the further information is required, accepting the further information from the secure facility resident.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be considered illustrative rather than limiting.

DETAILED DESCRIPTION

The claimed embodiments provide for an electronic request system that may be customized for specific request types such as a grievance or a medical assistance request as well as other types of requests. The system has numerous advantages such as not being paper-based, trackable, customizable, searchable, auditable as well as also freeing up staff member's time to perform more urgent facility-related duties.

Exemplary methods for utilizing the claimed embodiments will be further described in a later section. Firstly, FIGS. 1-6 will now be presented and then followed by FIGS. 7-10 which illustrate pre-verification methods.

FIGS. 1-6 are schematic diagrams of an example secure facility call management system that may be used in conjunction with the claimed embodiments.

Figure 1:
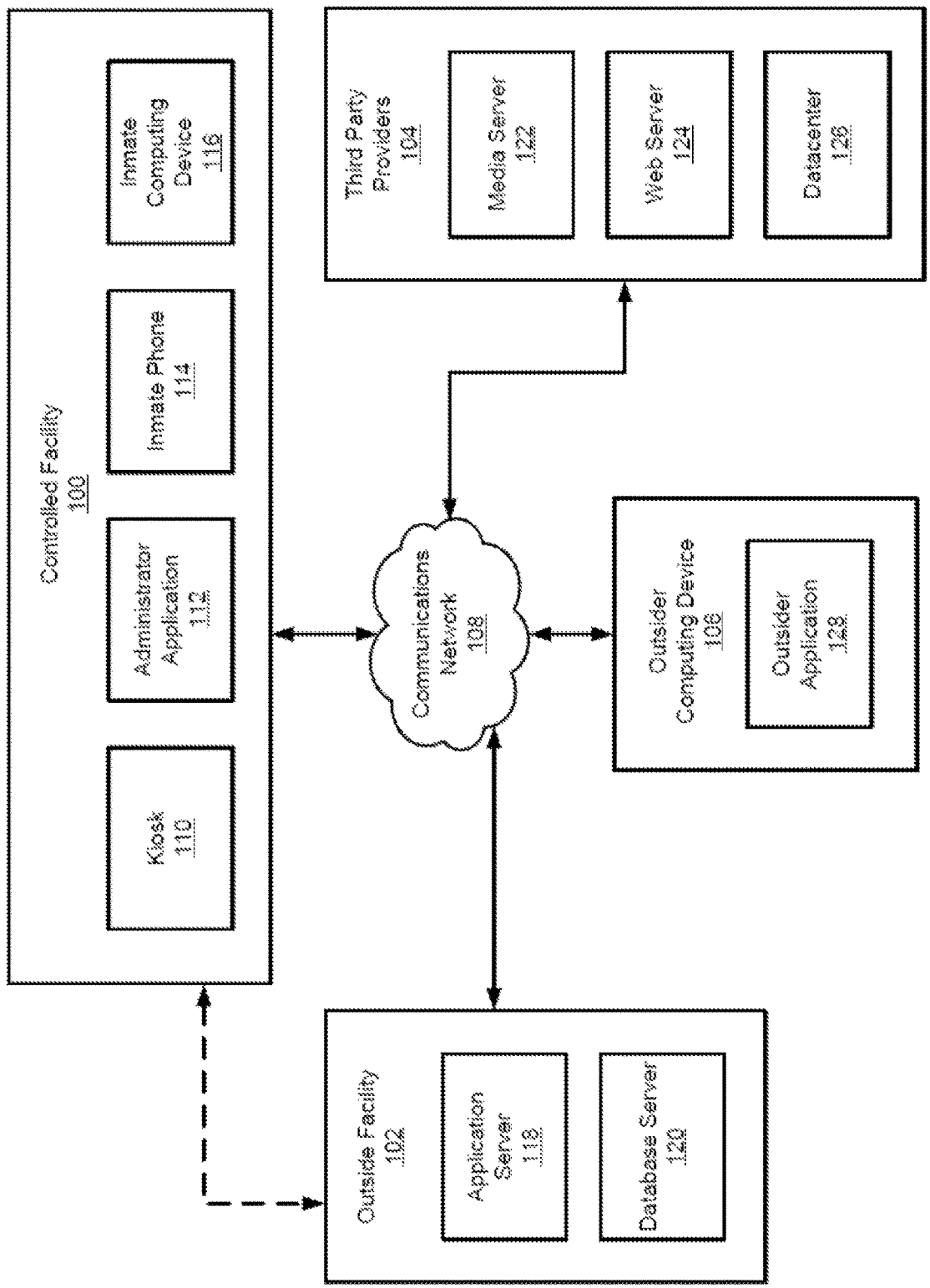
FIGS. 1-6 are schematic diagrams of an example secure facility call management system that may be used in conjunction with the claimed embodiments.

FIG. 1 shows a diagram of a system in accordance with at least one implementation of the claimed embodiments. As shown in FIG. 1, the system includes a controlled facility (100), an outside facility (102), third party providers (104), and an outsider computing device (106) each communicatively coupled to a communications network (108). The controlled facility (100) may include, but is not limited to, a kiosk (110), an administrator application (112), a resident phone (114), and a resident computing device (116). The outside facility (102) may include an application server (118) and a database server (120). The third party providers (104) may include a media server (122), a web server (124), and a datacenter (126). The outsider computing device (106) may include an outsider application (128).

In at least one implementation of the claimed embodiments, a controlled facility (100) is an access-restricted location. Examples of controlled facilities (e.g., controlled facility (100)) include, but are not limited to, detention environments (e.g., jails, prisons, etc.), immigration detention centers, military centers, government secure sites, law enforcement holding structures, secure business complexes, and psychiatric hospitals.

In at least one implementation of the claimed embodiments, a resident is a person within a controlled facility (100) who is subject to one or more restrictions, primarily to his or her freedom or rights. Examples of residents include, but are not limited to, prisoners, wards of the state, parolees, employees working in a secure business complex, temporary or long-term internees, patients, military personnel, uncharged suspects, and refugees. Resident restrictions may be part of a court-imposed sentence on a resident, while others may be specific to the controlled facility (100) in which the resident resides. Restrictions may include limitations on a resident's physical movement (i.e., physical restrictions) and limitations on the resident's ability to communicate (i.e., communication restrictions). Communication restrictions include resident use restrictions, resident target restrictions, and device use restrictions.

In at least one implementation of the claimed embodiments, resident use restrictions are limitations on a resident's general ability to communicate with visitors and/or outsiders. Resident use restrictions may include, for example, periods of time in which a resident is not allowed to communicate with outsiders or visitors (e.g., between 10 PM and 8 AM, during an imposed one-week punitive period, etc.) and limitations based on lack of funds (e.g., insufficient commissary account balance to initiate a communication).

In at least one implementation of the claimed embodiments, resident target restrictions are limitations on the target or source of a communication with the resident. Resident target restrictions may be specific outsiders or visitors with whom the resident is not allowed to communicate (e.g., the victim of a crime perpetrated by the resident, etc.). Resident target restrictions may also include types of people with whom the resident is not allowed contact (e.g., outsiders who are ex-cons, minors under the age of 18, etc.).

In at least one implementation of the claimed embodiments, device use restrictions are restrictions based on the condition or state of the communication device used by the resident. Device use restrictions include, for example, limitations based on the location of the resident's mobile device, limitations imposed based on a determination that the device has been tampered with, etc.

In at least one implementation of the claimed embodiments, an outsider is a person outside the controlled facility (100) who may be the source or target of a communication with a resident. An outsider who enters the controlled facility (100) for the purpose of communicating with a resident is referred to as a visitor.

In at least one implementation of the claimed embodiments, the kiosk (110) is a computing system with functionality to facilitate communication between a resident and a visitor or outsider. Such communication facilitation may include creating a system identity data item or secure social networking account, adding or importing contact information for outsiders with whom the resident wishes to communicate, uploading media (e.g., photos, videos, audio, and text) to, or viewing media from, a secure social network, sending or receiving messages or other media, acting as an endpoint for voice and video communication between a resident and a visitor or outsider, scheduling a communication, and managing a commissary or communications account. Further detail about kiosks (e.g., kiosk (110)) is provided in FIG. 2, FIG. 5A, FIG. 5B, and FIG. 6. Kiosks may also, in some implementations, be deployed outside of controlled facility 100.

In at least one implementation of the claimed embodiments, the administrator application (112) is a process or group of processes executing on a computing system with functionality to enable an administrator to create, remove, and/or enforce one or more restrictions on a resident. In at least one implementation of the claimed embodiments, an administrator is a person associated with the controlled facility charged with enforcing one or more restrictions. Examples of administrators include, but are not limited to, prison guards, orderlies, wardens, prison staff, jailers, information technology technicians, system administrators, and law enforcement agents. Using the administrator application, an administrator may retrieve or alter the identity data item and/or secure social network account of a resident, visitor, or outsider. Further detail about the administrator application (112) is provided in FIG. 2.

In at least one implementation of the claimed embodiments, the resident phone (114) is a device with functionality to send and receive audio communications between a resident and an outsider or visitor. In at least one implementation of the claimed embodiments, the resident phone (114) is a stationary (i.e., non-mobile) device. Further, a single resident phone (114) may be used by more than one resident. Further detail about the resident phone (114) is provided in FIG. 2.

In at least one implementation of the claimed embodiments, the resident computing device (116) is a computing device with functionality to enable a resident to communicate with a visitor or outsider. Specifically, the resident computing device (116) may be used to send or receive text messages and/or initiate or receive voice or video calls. In at least one implementation of the claimed embodiments, the resident computing device (116) also enables a resident to access a secure social network. Specifically, the resident computing device (116) may be used to upload media to, or view media from, a secure social network account of the resident or another secure social network member. In at least one implementation of the claimed embodiments, the resident computing device (116) is a mobile computing device (e.g., a smartphone, a laptop, a tablet, etc.). Further detail about the resident computing device (116) is provided in FIG. 2 and FIG. 6.

In at least one implementation of the claimed embodiments, the elements within the controlled facility (100) are communicatively coupled to the communications network (108). In at least one implementation of the claimed embodiments, the communications network (108) is a collection of computing systems and other hardware interconnected by communication channels. The communications network (108) may include networks that are exclusively or primarily used for a single type of communication, such as a telephone network (e.g., Plain Old Telephone System (POTS)), and/or networks used for a wide array of communication types, such as the Internet through Voice over IP (VOIP). Communication channels used by the communications network (108) may include, for example, telephone lines, networking cables, wireless signals, radio waves, etc. Fees charged and payments received by the provider(s) of the communications network (108) may involve multiple parties, including a service provider of the outside facility (102), the management of the controlled facility (100), and provider(s) of the communications network (108). In at least one implementation of the claimed embodiments, fees may be split between multiple parties based on the terms of underlying agreements or contracts between the parties. Further, rebates, reimbursements, and/or refunds may be afforded to and paid to the management of the controlled facility (100) based on the terms of underlying agreements or contracts between the parties. For example, the management of the controlled facility (100) may receive a rebate from the service provider of the services provided to residents based on such factors as the volume of use, the dollar amount, and/or the frequency of use.

In at least one implementation of the claimed embodiments, the outside facility (102) is a group of computing systems located outside of the controlled facility (100). Specifically, the outside facility (102) may house system elements with functionality to facilitate communication between residents and outsiders, access communication data between residents and outsiders, and enforce one or more restrictions imposed on residents and resident communications. In at least one implementation of the claimed embodiments, the outside facility (102) is connected directly to the controlled facility (100) bypassing a generally accessible communications network (communications network (108)). One or more of the components within the outside facility (102) may alternatively be located within the controlled facility (100) or within the third party providers (104).

In at least one implementation of the claimed embodiments, the application server (118) is a computing system with functionality to authenticate a resident, outsider, administrator, reviewer, or investigator for access to system functionality (e.g., initiating voice or video calls, sending text messages, etc.) or data stored on the database server (120) (e.g., resident identities, communications between residents and outsiders, etc.). The application server may authenticate residents, outsiders, administrators, reviewers, and/or investigators using passwords, biometric data, digital access codes, and/or physical access devices. Further detail about the application server (118) is provided in FIG. 3.

In at least one implementation of the claimed embodiments, the database server (120) is a computing system with functionality to store identities used to authenticate residents, outsiders, administrators, reviewers, and/or investigators. Such identities may include verified data used to compare to verification data provided by the resident, outsider, administrator, reviewer, or investigator to authenticate the resident, outsider, administrator, reviewer, or investigator.

In at least one implementation of the claimed embodiments, the database server (120) also stores communication data about communications between a resident and an outsider or visitor. Such communication data may include, for example, a recording of a video call, the length of a voice call, the frequency of video calls, sent and received text messages, etc. The database server (120) may also store media submitted to a secure social network before, during, and/or after the media has been reviewed. Further detail about the database server (120) is provided in FIG. 3.

In at least one implementation of the claimed embodiments, the third party providers (104) are computing systems that provide network application and data storage services (i.e., cloud computing services). Third party providers (104) may include service providers used directly by residents and outsiders, such as photo sharing services, general social networking sites, and digital music retailers. Third party providers (104) may include service providers employed by administrators and for use by residents and outsiders, such as audio and video streaming applications, conferencing applications, and secure social network media storage. One or more of the components within the third party providers (104) may alternatively be located within the controlled facility (100) or the outside facility (102).

In at least one implementation of the claimed embodiments, the media server (122) is a computing system or group of computing system with functionality to provide network application services to facilitate communication between a resident and an outsider, and to facilitate access to a secure social network. Such services include, but are not limited to, VoIP services, video conferencing services, and media streaming services.

In at least one implementation of the claimed embodiments, the web server (124) is a computing system or group of computing system with functionality to provide an interface to access and interact with webpages and other network application services. In at least one implementation of the claimed embodiments, the web server (124) is a type of media server (122).

In at least one implementation of the claimed embodiments, the datacenter (126) is a computing system or group of computing system with functionality to provide an interface to access and interact with data stored on one or more data servers (not shown). In at least one implementation of the claimed embodiments, the datacenter (126) is a type of media server (122).

In at least one implementation of the claimed embodiments, the outsider computing device (106) is a computing device with functionality to execute the outsider application (128). In at least one implementation of the claimed embodiments, the outsider computing device (106) is a mobile computing device (e.g., a smartphone, a laptop, a tablet, etc.). Further detail about the outsider computing device (106) is provided in FIG. 6.

In at least one implementation of the claimed embodiments, the outsider application (128) is a process or group of processes (in software, firmware, hardware, or combination thereof) with functionality to enable communication between an outsider and a resident. Specifically, the outsider application (128) may be used to send or receive text messages and/or initiate or receive voice or video calls. In at least one implementation of the claimed embodiments, the outsider application (128) also enables an outsider to access a secure social network. Specifically, the outsider application (128) may be used to upload media to, or view media from, a secure social network account of the outsider, a resident, other secure social network member.

Figure 2:
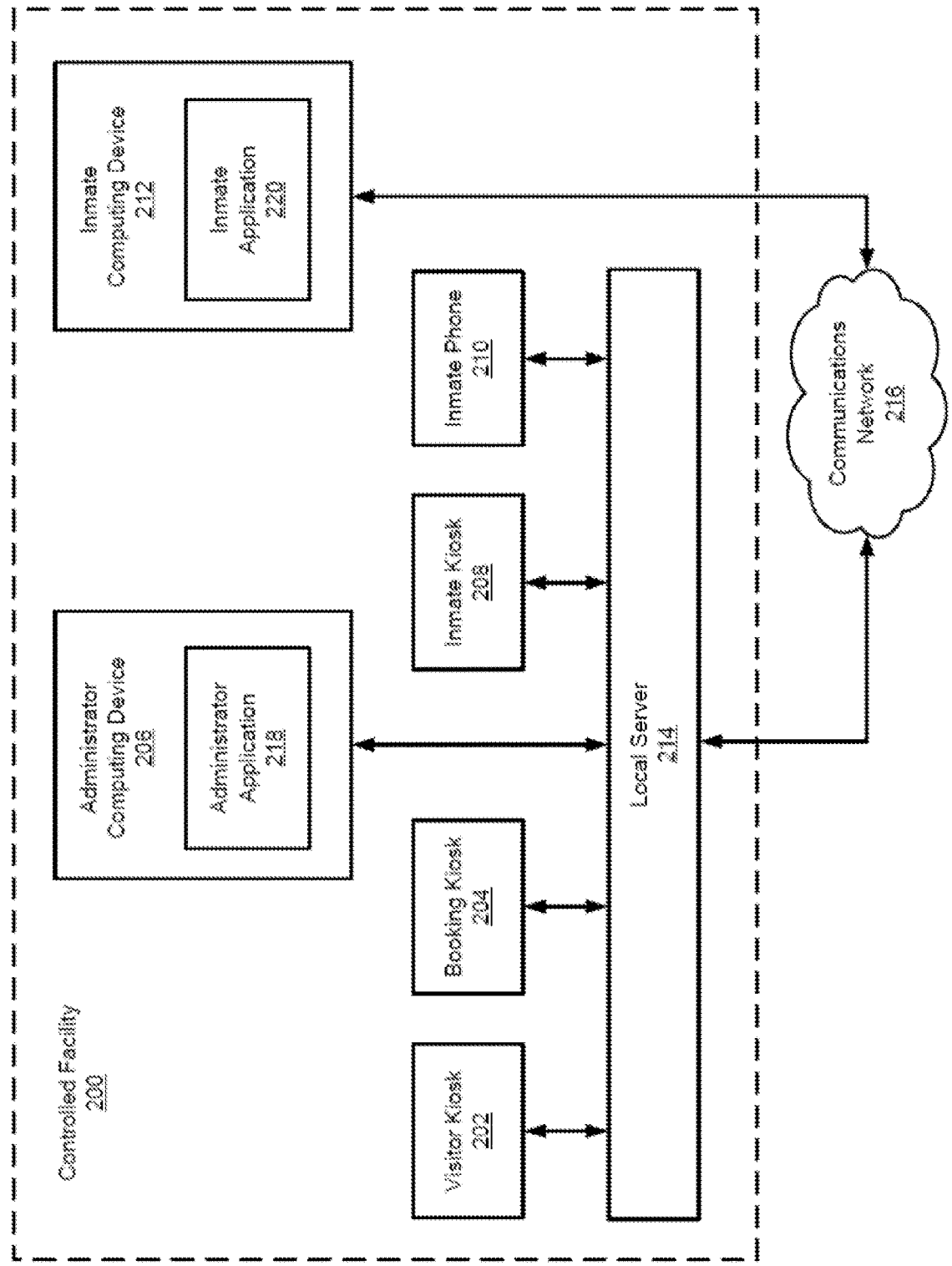

FIG. 2 shows a controlled facility in accordance with at least one implementation of the claimed embodiments. As shown in FIG. 2, the controlled facility (200) may include a visitor kiosk (202), a booking kiosk (204), an administrator computing device (206), a resident kiosk (208), a resident phone (210), a resident computing device (212), and a local server (214). The resident computing device (212) and the local server (214) are communicatively coupled to the communications network (216). The administrator computing device (206) includes an administrator application (218). The resident computing device (212) includes a resident application (220).

In at least one implementation of the claimed embodiments, the visitor kiosk (202) is a computing system with functionality to facilitate communication between a resident and a visitor. Specifically, the visitor kiosk (202) may be a combination of computing hardware and software used by a visitor to make and receive voice and video calls to/from a resident residing in the same controlled facility (200) or another controlled facility (not shown). The visitor kiosk (202) may also be used to schedule a voice or video call with a resident for a future date. Further, the visitor kiosk (202) may also include the functionality to exchange media (e.g., photos, videos, and audio) with a resident residing in the controlled facility (200). The visitor kiosk (202) may include functionality to generate such media, such as a camera, microphone, keyboard, and software to record or otherwise create media to send to a resident. Such media may be subject to review before being delivered.

In at least one implementation of the claimed embodiments, a visitor wanting to use a visitor kiosk (202) may be required to participate in an authentication process to verify the identity of the visitor. The authentication process may include creating an identity data item and verified data for storage and later comparison. The verified data used for authentication may be a username and password combination and/or biometric information about the visitor.

In at least one implementation of the claimed embodiments, the visitor kiosk (202) includes functionality to access a secure social network. Specifically, the visitor kiosk (202) may be used by a visitor to create and manage a secure social network account. The visitor kiosk (202) may also be used by a visitor to upload digital media to the visitor's secure social network account or the account of another secure social network member. The visitor kiosk (202) may further be used to view digital media uploaded to the visitor's social network account or the account of another secure social network member.

In at least one implementation of the claimed embodiments, the visitor kiosk (202) includes functionality to manage a commissary account for one or more residents. Specifically, a visitor may use a visitor kiosk (202) to add money to the commissary account of a resident in the controlled facility (200), view a transaction history of the commissary account, transfer funds between commissary accounts, and/or remove funds from a commissary account. Further detail about the visitor kiosk (202) is provided in FIG. 5A and FIG. 5B.

In at least one implementation of the claimed embodiments, the booking kiosk (204) is a computing system with functionality to aid administrators in admitting a resident into a controlled facility (e.g., controlled facility (200)). Specifically, the booking kiosk (204) may include functionality to create or update a resident identity data item. Specifically, the booking kiosk (204) may be used to obtain verified data (e.g., passwords, biometric data, etc.) and save the verification data in one or more identity data items for the resident. The verified data may then be used to authenticate the resident (e.g., to access the communications network (216), etc.). In at least one implementation of the claimed embodiments, the booking kiosk may also be used to associate one or more restrictions with the resident via the resident's identity data item.

In at least one implementation of the claimed embodiments, the booking kiosk (204) includes functionality to input contact information for visitors, outsiders, administrators, or other residents with whom the resident wants to communicate. Such contact information may then be associated with the resident's identity data item, and may be used to initiate a voice or video call, or otherwise transmit media to visitors, outsiders, or other residents. Further, in at least one implementation of the claimed embodiments, the contact information may be retrieved from a resident's mobile computing device (e.g., cell phone, smart phone, etc.) or a local or remote data storage device (e.g., a flash drive, a webmail account, etc.). The contact information may be retrieved using a wired or wireless connection between the booking kiosk and the resident's mobile computing device and/or the data storage device. The contact information may be subject to review before the resident is permitted to contact the visitor, outsider, administrator, or other resident.

In at least one implementation of the claimed embodiments, the booking kiosk (204) includes functionality to prepare a mobile computing device for use by the resident within the controlled facility (200). Specifically, a controlled facility (200) may allow residents the use of computing devices while in or subject to the controlled facility (200). However, use of such resident computing devices may require that the computing device is instrumented with software restricting the use of the resident computing device. The booking kiosk (204) may be used to instrument the resident computing device as required. Further detail about the booking kiosk (204) is provided in FIG. 5A and FIG. 5B.

In at least one implementation of the claimed embodiments, the administrator computing device (206) is a computing system or group of computing systems with functionality to execute the administrator application (218). In at least one implementation of the claimed embodiments, the administrator application (218) is a process or group of process with functionality to provide access to communications between residents at the controlled facility (200) and visitors, outsiders, administrator, and other residents. The administrator application (218) may also be used to monitor current voice or video calls between a resident and a visitor, outsider, administrator, or other resident.

In at least one implementation of the claimed embodiments, the administrator application (218) is used to manage an identity data item associated with a resident. Such management may include altering the restrictions (device use restrictions, resident use restrictions, and resident target restrictions) applicable to the resident. In at least one implementation of the claimed embodiments, the administrator application (218) is used to access the secure social network account of a resident, visitor, or outsider. In at least one implementation of the claimed embodiments, the administrator application (218) may provide heightened access (i.e., a level of access greater than that of the resident, visitor, or outsider) to data stored in the secure social networking account.

In at least one implementation of the claimed embodiments, the resident kiosk (208) is a computing system with functionality to facilitate communication between a resident and a visitor or outsider. Specifically, the resident kiosk (208) may be a combination of computing hardware and software used by a resident to make and receive voice and video calls to/from a visitor, outsider, or another resident residing in another controlled facility (not shown). The resident kiosk (208) may also be used to schedule a voice or video call with a visitor at a future date. Initiating or scheduling a voice or video call may include determining whether the currently attempted call or the scheduled call are adverse to one or more restrictions (e.g., resident use restrictions, device use restrictions, and/or resident target restrictions). Further, the resident kiosk (208) may also include the functionality to exchange media (e.g., photos, videos, and audio) with a visitor or outsider. The resident kiosk (208) may include functionality to generate such media, such as a camera, microphone, keyboard, and software to record or otherwise create media to send to a visitor or outsider. Such media may be subject to review before being delivered.

In at least one implementation of the claimed embodiments, a resident wanting to use a resident kiosk (208) may be required to participate in an authentication process to verify the identity of the resident. The authentication process may include providing verification data for comparison to verified data previously obtained from the resident and stored in the resident identity data item. The verified data may be a username and password combination and/or biometric information about the resident.

In at least one implementation of the claimed embodiments, the resident kiosk (208) includes functionality to access a secure social network. Specifically, the resident kiosk (208) may be used by a resident to manage a secure social network account. The resident kiosk (208) may include functionality to generate such media, such as a camera, microphone, keyboard, and software to record or otherwise create media to send to a visitor or outsider. The resident kiosk (208) may also be used by a resident to upload digital media to the resident's secure social network account or the account of another secure social network member. The resident kiosk (208) may further be used to view digital media uploaded to the resident's social network account or the account of another secure social network member. Uploaded media may be subject to review before posting.

In at least one implementation of the claimed embodiments, the resident kiosk (208) includes functionality to manage a commissary account for the resident. Specifically, a resident may use a resident kiosk (208) to view a transaction history of the commissary account and/or to apply commissary funds for goods and services consumed or enjoyed by the resident. Further detail about the resident kiosk (208) is provided in FIG. 5A and FIG. 5B.

In at least one implementation of the claimed embodiments, the resident phone (210) is a device with functionality to send and receive audio communications between a resident and an outsider or visitor. The resident phone (210) may be implemented as handset connected to a telephone line. In at least one implementation of the claimed embodiments, all or part of the voice call may be conducted over a VoIP connection. In at least one implementation of the claimed embodiments, a single resident phone (210) is utilized by multiple residents.

In at least one implementation of the claimed embodiments, initiating or receiving a voice call using the resident phone (210) requires a form of authentication (e.g., providing a password, personal identification number, or voice verification). In at least one implementation of the claimed embodiments, voice calls made using the resident phone (210) are monitored by one or more administrators using the administrator computing device (206), and are recorded and stored in a data storage system within the controlled facility (200), within the outside facility (not shown), or within a third party provider (not shown). The resident phone (210) may also be subject to device use restrictions limiting the ability to use the resident phone (210) at certain times (e.g., between 9 PM and 8 AM) or under certain conditions (e.g., emergency lockdown).

In at least one implementation of the claimed embodiments, the identity of the visitor or outsider targeted by the resident or attempting to contact the resident using the resident phone (210) is verified against resident target restrictions imposed on the resident. Such restrictions may be associated with the resident's identity data item and may be stored locally within the controlled facility (200), within the outside facility (not shown), or within a third party provider (not shown). The visitor or outsider identity may be verified by the local server (214) or by another server within the outside facility (not shown), or within a third party provider (not shown).

In at least one implementation of the claimed embodiments, the resident computing device (212) is a computing system configured to execute the resident application (202). In at least one implementation of the claimed embodiments, each resident computing device (212) is utilized exclusively by a single resident. In at least one implementation of the claimed embodiments, access to the resident application requires a form of initial authentication. This initial authentication may use verification data stored locally on the resident computing device (212) (e.g., a code or combination used to unlock the phone, locally stored biometric data, etc.).

In at least one implementation of the claimed embodiments, accessing a communications network (e.g., communications network (216)) using the resident application (220) may require further network-based authentication. This further authentication may use verification data stored external to the resident computing device (212) but locally within the controlled facility (200), or remotely within the outside facility (not shown) or within a third party provider (not shown).

In at least one implementation of the claimed embodiments, an authenticated resident may use the resident application to initiate or receive voice or video calls, initiate or receive text or media messages, schedule a voice or video call, manage a commissary account, or post media to a secure social network. In at least one implementation of the claimed embodiments, voice and video calls made using the resident computing device (212) are monitored by one or more administrators using the administrator computing device (206), and are recorded and stored in a data storage system within the controlled facility (200), within the outside facility (not shown), or within a third party provider (not shown).

In at least one implementation of the claimed embodiments, the identity of the visitor or outsider targeted by the resident or attempting to contact the resident using the resident computing device (212) is verified against resident target restrictions imposed on the resident. Such restrictions may be associated with the resident's identity data item and may be stored locally within the controlled facility (200), within the outside facility (not shown), or within a third party provider (not shown). The visitor or outsider identity may be verified by the local server (214) or by another server within the outside facility (not shown), or within a third party provider (not shown).

In at least one implementation of the claimed embodiments, the resident computing system (212) and/or the resident application (220) may limit access to the communications network (216) based on one or more restrictions (resident use restrictions, resident target restrictions, and device use restrictions). Further, the resident computing system (212) and/or the resident application (220) may gather data from input devices of the resident computing system (212) to determine whether one or more restrictions apply. Such input devices may include, for example, a system clock, a global positioning system antenna, a wide area network antenna, etc.

In at least one implementation of the claimed embodiments, the local server (214) is a computer system or group of computers systems located within the controlled facility (200) that facility communication between residents and visitors, outsiders, and/or other residents. Specifically, the local server (214) may implement the software necessary to host voice and video calls between and among the visitor kiosk (202), the resident kiosk (208), the resident phone (210), and an outsider computing system (not shown). The local server (214) may also include functionality to enforce communication restrictions associated with the residents using the resident kiosk (208) or resident phone (210). Alternatively, the local server (214) may merely provide access to other systems capable of hosting the communication software and data storage (e.g., located within an offsite facility or a third party provider). Further, in at least one implementation of the claimed embodiments, the local server (214) includes functionality to regulate resident access to a secure social network.

Figure 3:
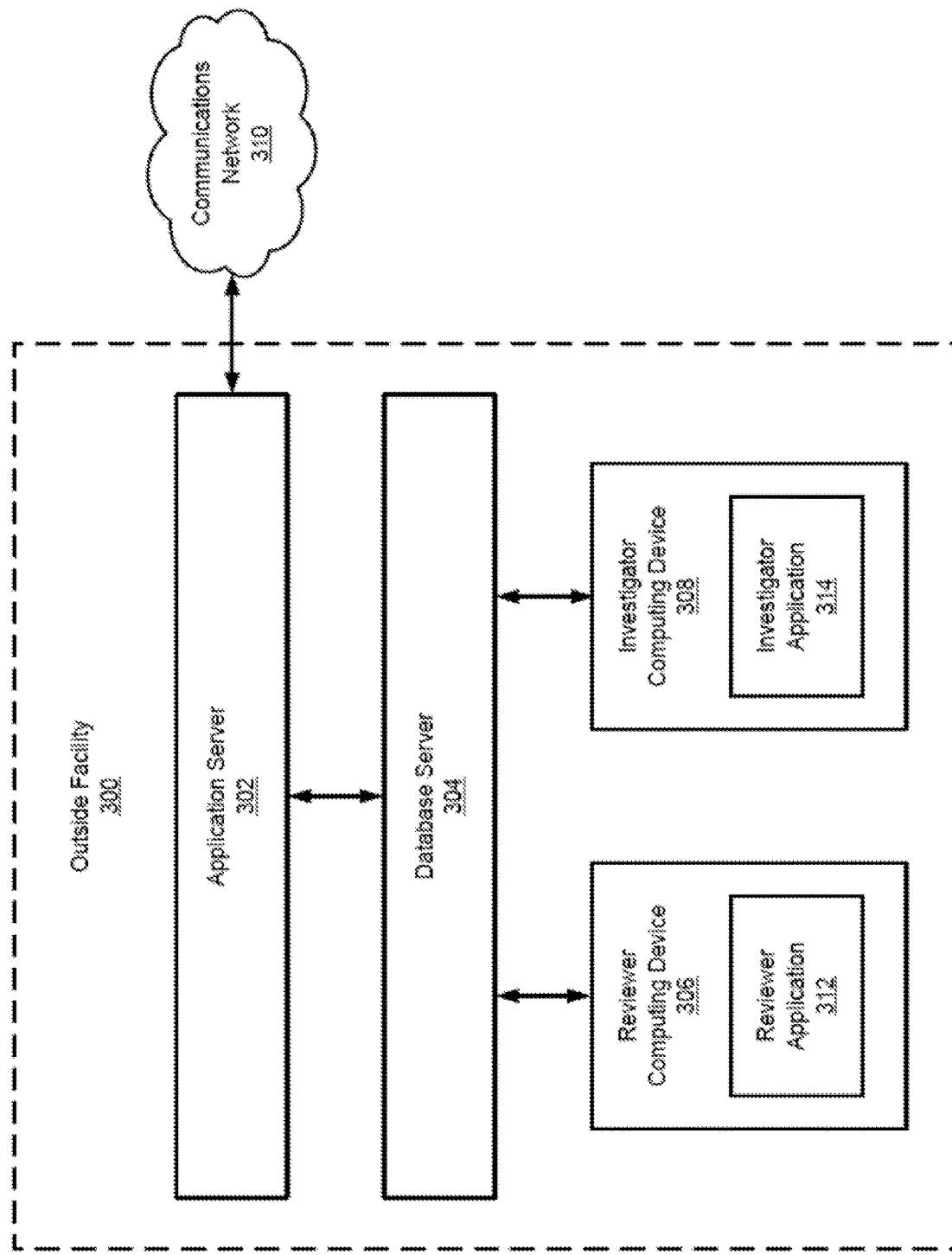

FIG. 3 shows an outside facility in accordance with at least one implementation of the claimed embodiments. As shown in FIG. 3, the outside facility (300) may include an application server (302), a database server (304), a reviewer computing system (306), and an investigator computing system (308). The application server (302) is communicatively coupled to the communications network (310). The reviewer computing device (306) may include a reviewer application (312), and the investigator computing device (308) may include an investigator application (314).

In at least one implementation of the claimed embodiments, the application server (302) is a computing system or group of computing systems configured to authenticate residents, visitors, outsiders, administrators, reviewers, and/or investigators. Specifically, the application server (302) includes functionality to receive a request to authenticate a resident, visitor, outsider, administrator, reviewer, and/or an investigator, retrieve verified data associated with the request, and compare the verified data to verification data submitted in the authentication request. In at least one implementation of the claimed embodiments, the application server provides access to identity data items and other data stored in the database server (304).

In at least one implementation of the claimed embodiments, the database server (304) is a computing system or group of computing system configured to store data about residents, visitors, outsiders, administrators, reviewers, and/or investigators as well as communication data describing communications between and among residents, visitors, outsiders, administrators, reviewers, and/or investigators. Data stored in the database server may include, but is not limited to, identity data items, verified data, approved communication media, communication media pending review In at least one implementation of the claimed embodiments, the reviewer computing device (306) is a computing system configured to execute the reviewer application (312). In at least one implementation of the claimed embodiments, a reviewer is a person charged with viewing a media item submitted by a resident, visitor, outsider or administrator, and determining one or more attributes of the media item. Based on the determined attributes of the media item, the reviewer may then approve the media item for transmission to its target resident, visitor, or outsider. Alternatively, the reviewer may reject the media item, conditionally approve the media item, or redact parts of the media item, thus preventing complete transmission to its target resident, visitor, or outsider. In at least one implementation of the claimed embodiments, the reviewer application (312) include functionality to view media items, associate one or more attributes to the media item, and/or mark the media items as approved or rejected.

In at least one implementation of the claimed embodiments, the investigator computing device (308) is a computing system configured to execute the investigator application (314). In at least one implementation of the claimed embodiments, an investigator is a person gathering information about a resident, visitor, or outsider generally for the purposes of law enforcement. The investigator application (314) includes functionality to provide access to data stored on the database server (304) for investigative purposes.

Figure 4:
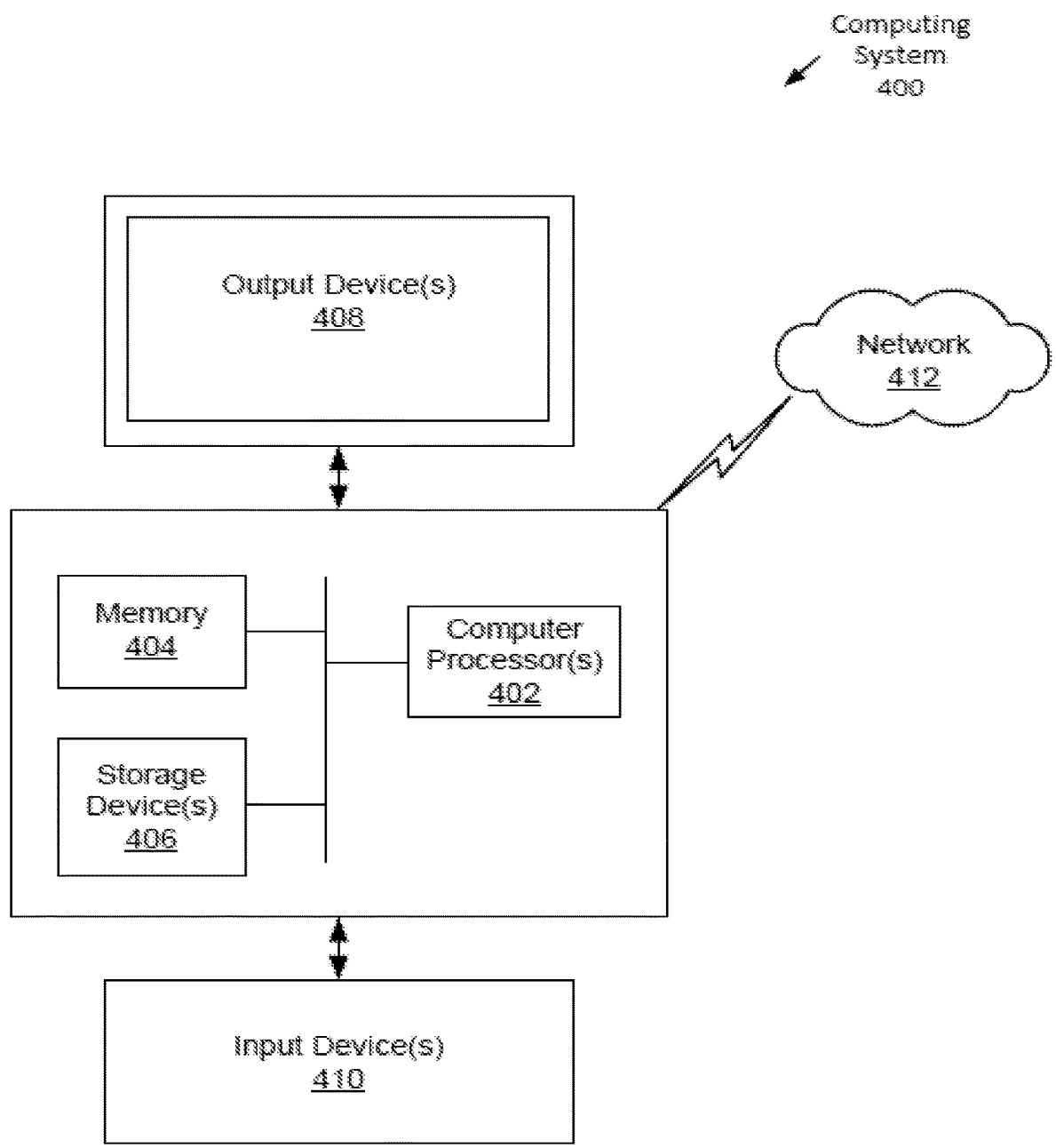

FIG. 4 shows a general computing system in accordance with at least one implementation of the claimed embodiments. As shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, camera, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (414) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (414). Further, embodiments of the invention may be implemented on a distributed system having a plurality of nodes, where each portion of the invention may be located on a different node within the distributed system. In at least one implementation of the claimed embodiments, the node corresponds to a distinct computing device. Alternatively, the node may correspond to a computer processor with associated physical memory. The node may alternatively correspond to a computer processor or micro-core of a computer processor with shared memory and/or resources.

Figure 5A:
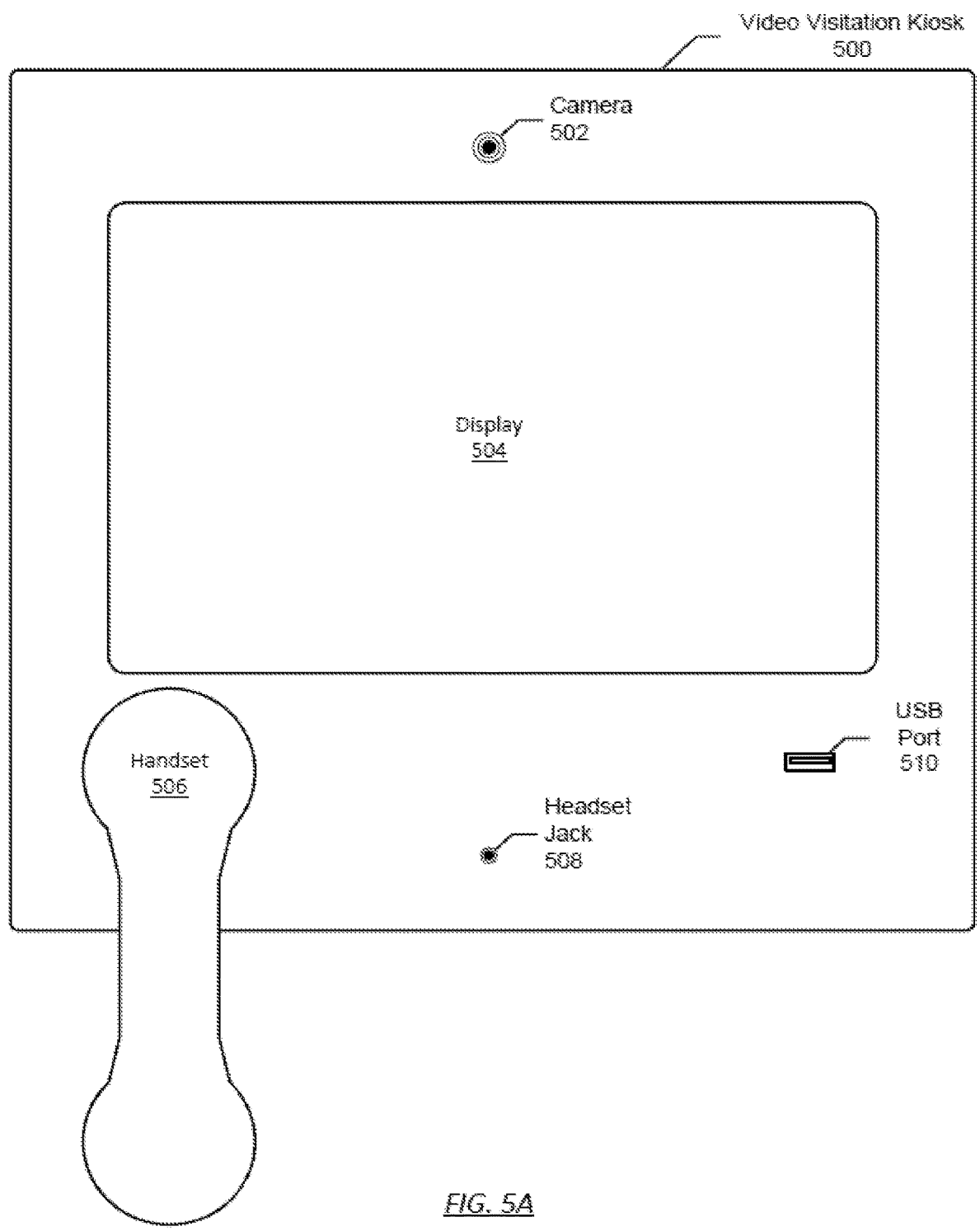

FIG. 5A shows a video visitation kiosk in accordance with at least one implementation of the claimed embodiments. Specifically, the video visitation kiosk (500) is a type of computing device as described in FIG. 4. As shown in FIG. 5A, the video visitation kiosk (500) includes a camera (502), a display (504), a handset (506), a headset jack (508), and a universal serial bus (USB) port (510).

Figure 5B:
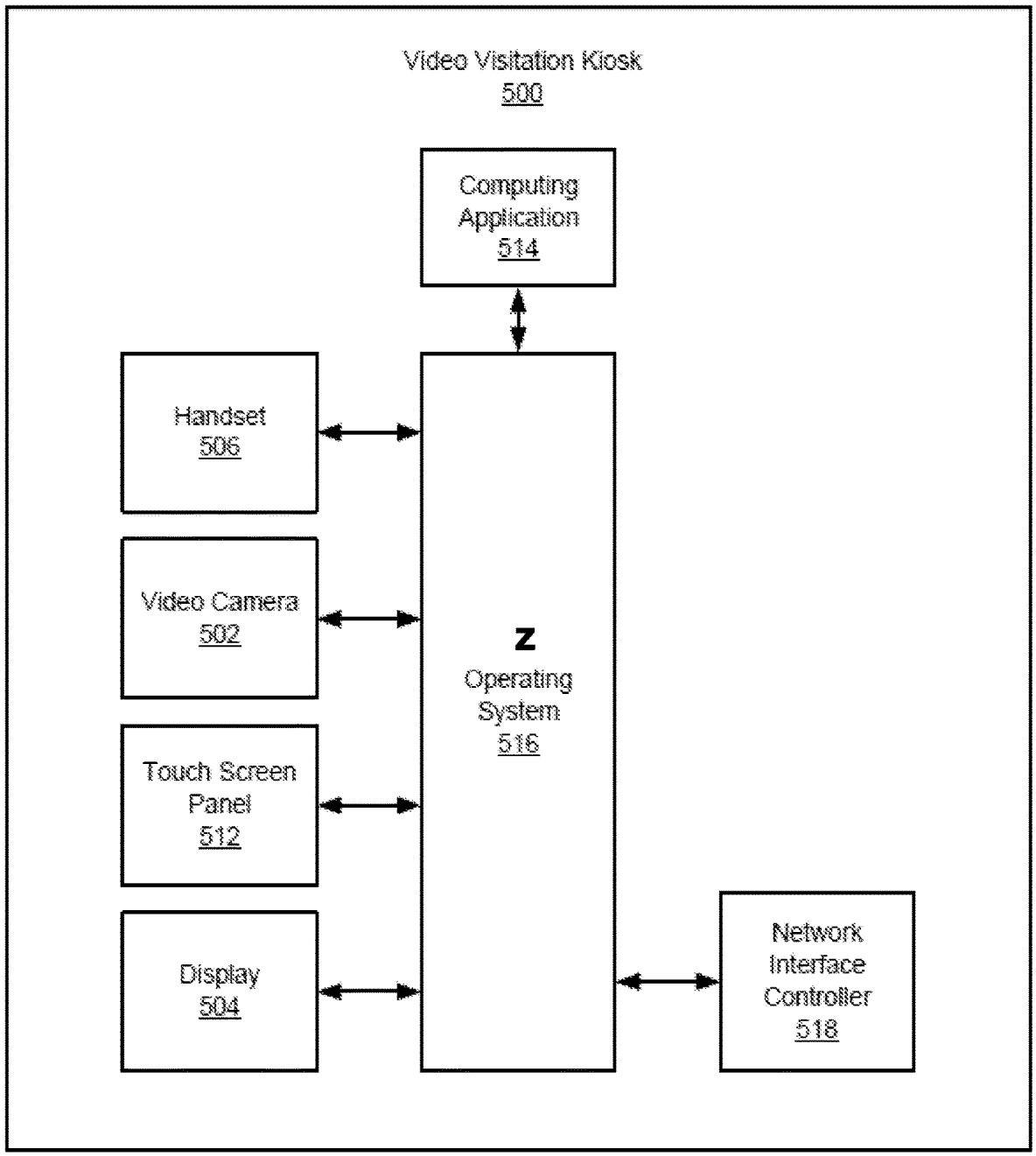

FIG. 5B shows the hardware and software elements of a video visitation kiosk in accordance with at least one implementation of the claimed embodiments. The hardware and software elements shown in FIG. 5B may be in addition to the elements described in FIG. 4. As shown in FIG. 5B, the video visitation kiosk (500) includes a handset (506), a video camera (502), a touch screen panel (512), a display (504), a computing application (514), an operating system (516), and a network interface controller (518).

Figure 6:
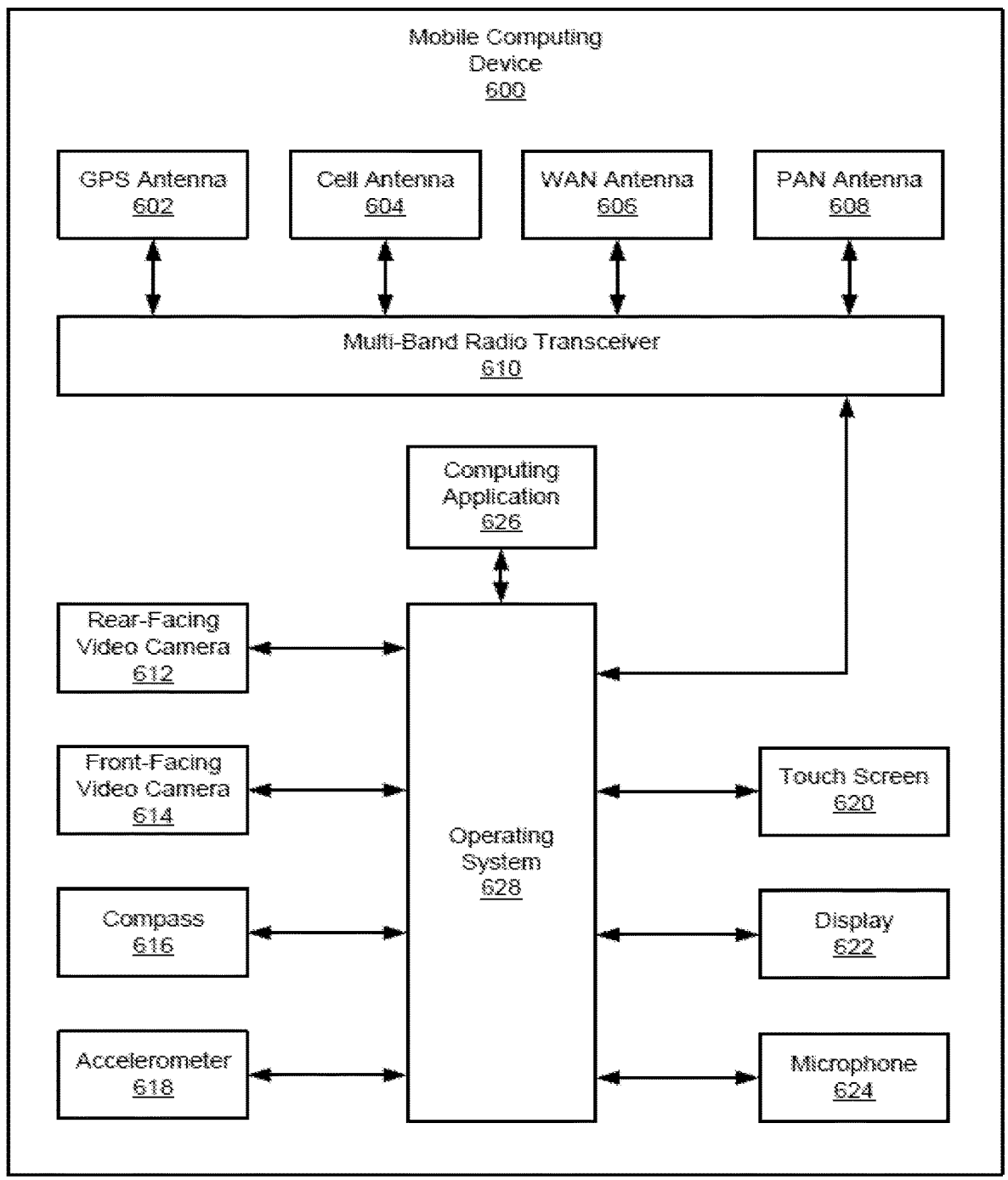

FIG. 6 shows the hardware and software elements of a mobile computing device in accordance with at least one implementation of the claimed embodiments. Specifically, the mobile computing device (600) is a type of computing device as described in FIG. 4. The hardware and software elements shown in FIG. 6 may be in addition to the elements described in FIG. 4.

As shown in FIG. 6, the mobile computing device (600) may include a global positioning system (GPS) antenna (602), a cell antenna (604), a wide area network (WAN) antenna (606), and a personal area network (PAN) antenna (608), each connected to a multi-band radio transceiver (610). The mobile computing device (600) also may include a rear-facing video camera (612), a front-facing video camera (614), a compass (616), an accelerometer (618), a touch screen (620), a display (622), and a microphone (624). The mobile computing device (600) also may include a computing application (626) executing on an operating system (628).

This disclosure also relates to methods and systems used in a detention environment for verifying an individual's identity utilizing a centralized database operable across disparate types of interactions. Current methods and systems for identity verification in detention environments are non-uniform for disparate types of interactions and the methods and systems are not easily compatible with one another. Therefore, it is difficult to track interactions of an individual and an individual subject to the detention environment. The disclosed method and system verify all individuals contacting, interacting with or otherwise connecting to an individual subject to the detention environment. In contrast, those individuals subject to the detention environment, such as residents, patients, or detainees, may be verified using existing methods and systems since it is possible to obtain a wide range of information from the individual when they are in the detention environment. For example, when a prisoner is processed through a jail, it is common for the jail to obtain the prisoner's identity information such e.g., as fingerprints, DNA samples, and voice samples.

Figure 7:
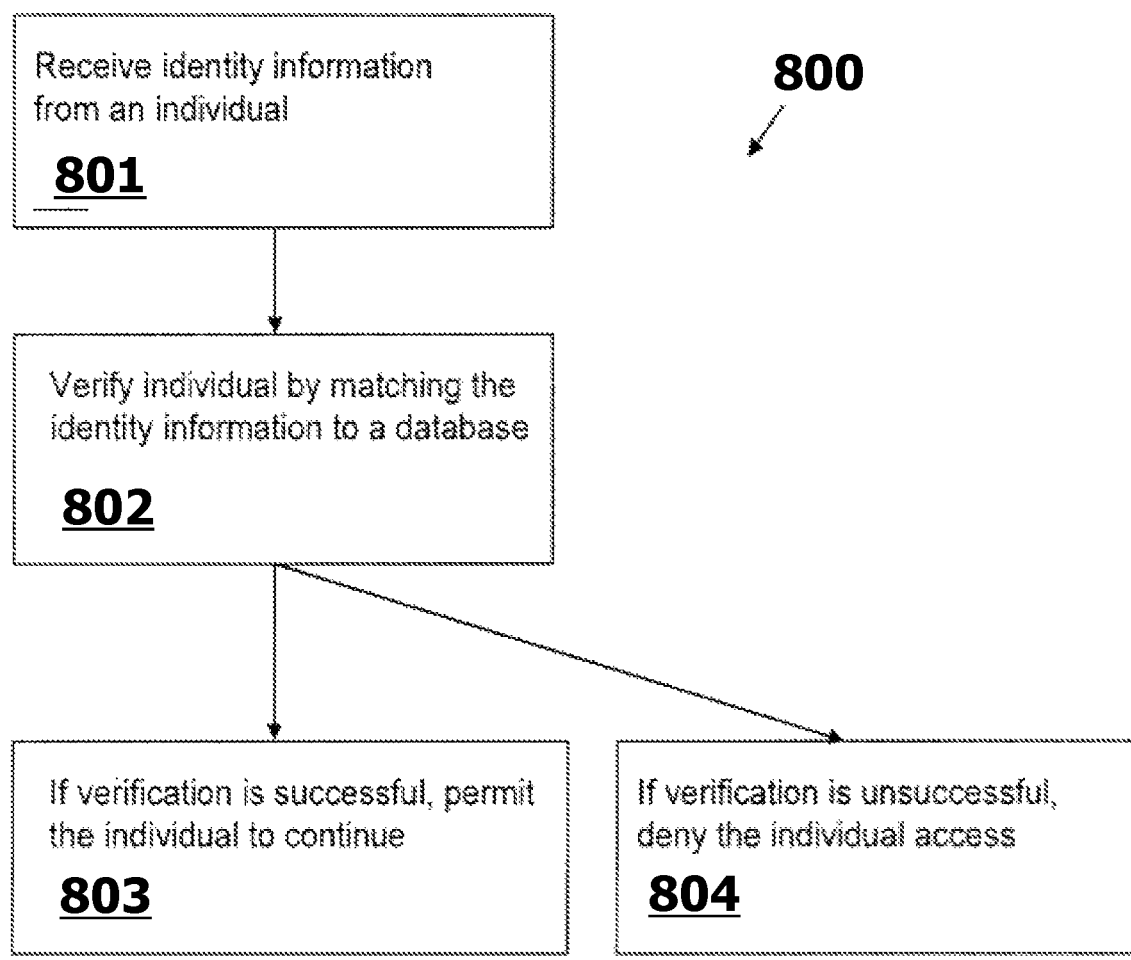
FIGS. 7-10 are schematic diagrams that illustrate methods and system for identity verification in a detention environment.

FIG. 7 is a diagram illustrating one embodiment of a method 800 according to aspects of the present disclosure. The method 800 is designed for use within a detention environment or as part of a method monitoring a detention environment. This method 800 applies to anyone who attempts to interact with an individual subject to a detention environment, for example, by visiting or making a transaction on behalf of the individual subject to the detention environment. As used herein, the term "individual" is used to refer to a person attempting to interact with, or on behalf of, a person subject to the detention environment who will be referred to herein as the "individual subject to the detention environment." The method 800 receives the individual's identity information at step 801 by way of a programmable device or system, such as e.g., a computer, a call screening system, a detention environment guard, or an interactive audio/video system and device for use in a detention environment disclosed in U.S. patent application Ser. No. 13/088,883, which is incorporated by reference herein. It should be appreciated that where a definition or use of a term in an incorporated application or reference is inconsistent with or contrary to the definition of that term provided herein, the definition of that term provided herein applies. The individual could be prompted to input identity information, such as, the zip code of their residence, mother's maiden name, a number of digits of the applicant's social security number, or other questions that lead to a unique individual. Identity information may also be contained in an identification card, which is processed by the programmed device or system, and may assist with the verification process. As just one example, an individual may scan their driver's license, and the programmed device or system may read the license, and fill out form fields such as name, address, and gender based on information on the license. This process may be implemented by use of a magnetic strip, a two-dimensional or three-dimensional bar code, or optical character recognition. Identity information may also be biometric information, such as, facial recognition, body recognition, voice recognition, retinal scan, fingerprint, DNA sample, or palm print. Identity information may also come from an interaction with the individual's phone, such as, swiping a phone through a scanner, keying in a unique phrase or number that was sent to a phone, or answering a call made to the individual's phone.

The method 800 is also designed to verify an individual's identity by matching the individual's identity information with information in a database (at step 802). The database is populated with identity information from a data source or a plurality of data sources. In some cases the identity information from the data source existed prior to the individual's interaction with the individual subject to the detention environment. These data sources may include: line information databases to find phone number and address associations; best known name and address databases to associate names with addresses; identification verification databases to match a provided name with digits of a social security number or other unique participant-assigned number; national financial information databases for existing financial records; national passport database; other government issued identification database such as a drivers' license database, a military identification database, or state issued identification card database; open warrants database; a national victim notification network such as VINE or VINELink; or a "do not contact" database. The database may also be populated by the data sources upon command, at intervals, or dynamically.

The method 800 is also desirably compatible with a data source such as the consolidated voicemail platform disclosed in U.S. patent application Ser. No. 12/826,168, which is incorporated by reference herein, and an information exchange facilitating system such as e.g., the secure social network disclosed in U.S. patent application Ser. No. 13/438,940, which is also incorporated by reference herein.

In some circumstances, an investigator will review attempted interactions with individuals subject to the detention environment. As just one example, an individual will attempt to interact by depositing money in the commissary account of an individual subject to the detention environment. The method 800 will check the database, and ask the individual enough questions until the method 800 is able to positively match the individual's identity information with information in the database. A consequence of this method 800 is that individuals will be verified upon each attempted interaction. For example, there may be several variations of J. Jones, J. D. Jones, Jonathan Jones, and John Jones appearing in a criminal investigation that involves attempted interactions with an individual subject to a detention environment. The identification of a J. Jones in a metropolitan area may require an extraordinary effort. Since the disclosed method 800 requires verification of an individual before he/she is allowed to interact with an individual subject to the detention environment, the disclosed method 800 may pinpoint the identity to a distinct individual named Jonathan D. Jones.

In an additional embodiment, the step of receiving identity information may also include receiving additional information from the individual after the individual is verified, such as e.g., a photograph or digital image of the individual, a scan of the individual's identification card, and additional information from additional questions. After the individual is verified, the individual may also establish a username and password, or a unique personal identification phrase, number, or series of characters. This establishment of a username and password would facilitate an additional identification process during future attempted interactions.

In another embodiment, the disclosed method supplements a verified identity with additional information from the database such as e.g., a date of birth, an address, and/or a photograph. In yet another embodiment, information, such as a phone number, associated with the individual is found to be associated with previous phone calls made by the individual subject to the detention environment. In this case, the disclosed method may associate those previous phone calls with the verified identity information, allowing the method to retroactively link a person in a detention environment to a specific verified person through a phone number. Similar associations could be made through credit card data, address data, and more.

In another embodiment, when an individual had been previously verified, the method 800 may receive a previously verified individual's username and password as the identity information during the verification process (i.e., step 801). The method 800 may also receive a previously verified individual's physical attributes as the identity information during the verification process. The physical attributes may include a voiceprint comparison, facial or body recognition, DNA sample, retinal scan, or other form of biometric attribute. The method 800 may also receive a previously verified individual's identification credential as the identity information during the verification process; this may include a passport, drivers license, military identification, or similar. The method 800 may also receive during the verification process a previously verified individual's mobile phone interaction as the identity information, which may involve responding to a phone call or text message, or requiring the previously verified individual to call or text message to a specific phone number. In the absence of all other means of identification, or as a means to expedite the process, the method 800 may receive a detention environment staff member's authorization to authenticate a verified individual by sight, or through spoken or direct questions.

After step 802 is complete, the method 800 will either verify or not verify an individual's identity. The method 800 will either permit the individual to continue if the individual is verified at step 803, or deny the individual access if the individual is not verified at step 804. If the individual is not permitted to continue, then the method may proceed to the additional steps shown in FIG. 8. If the individual is permitted to continue, then the method may proceed to the additional steps shown in FIG. 9.

Figure 8:
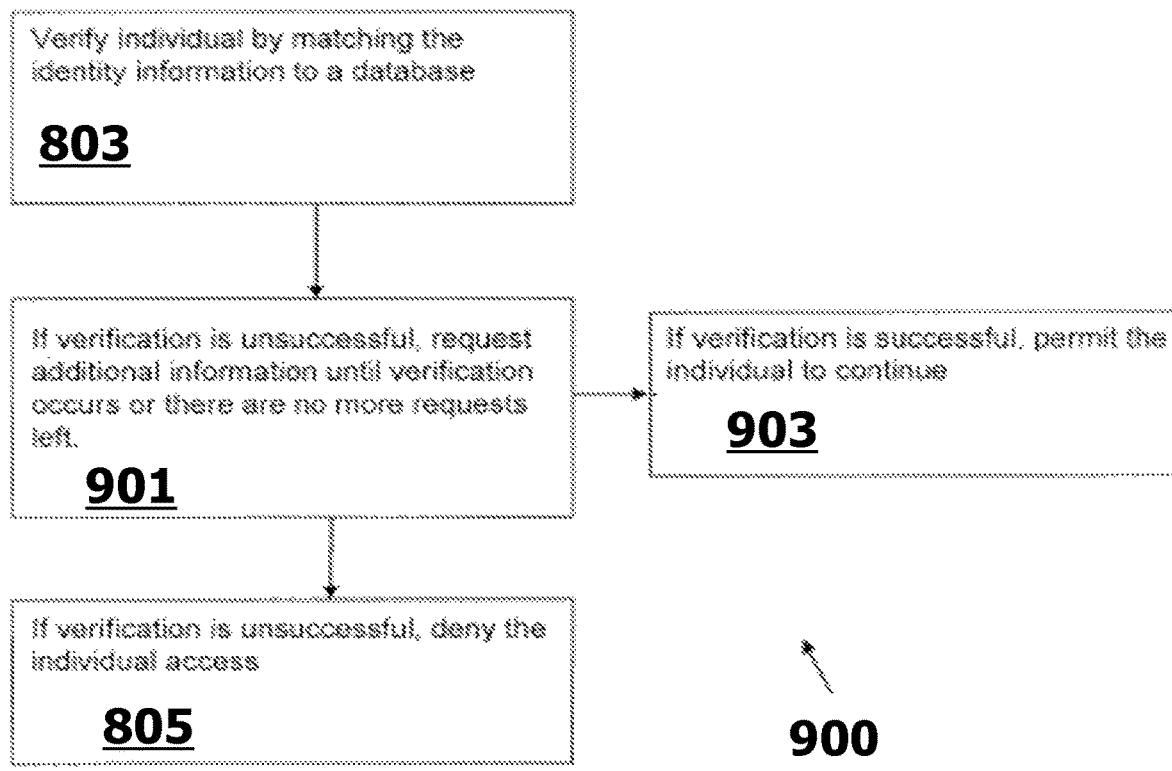

FIG. 8 illustrates an additional method designed for use when method 800 receives an individual's identity information, but fails to verify the individual. In that circumstance, method 900 will request additional identity information from the individual until a match is found or there are no more requests left to issue (step 901). The method 900 may request as many types of identity information from an individual as there are in the database. If verification is successful, the method 900 permits the individual to interact with the detention environment at step 903. If the verification is still unsuccessful, then the method 900 denies the individual interaction with the individual subject to the detention environment (step 804).

Figure 9:
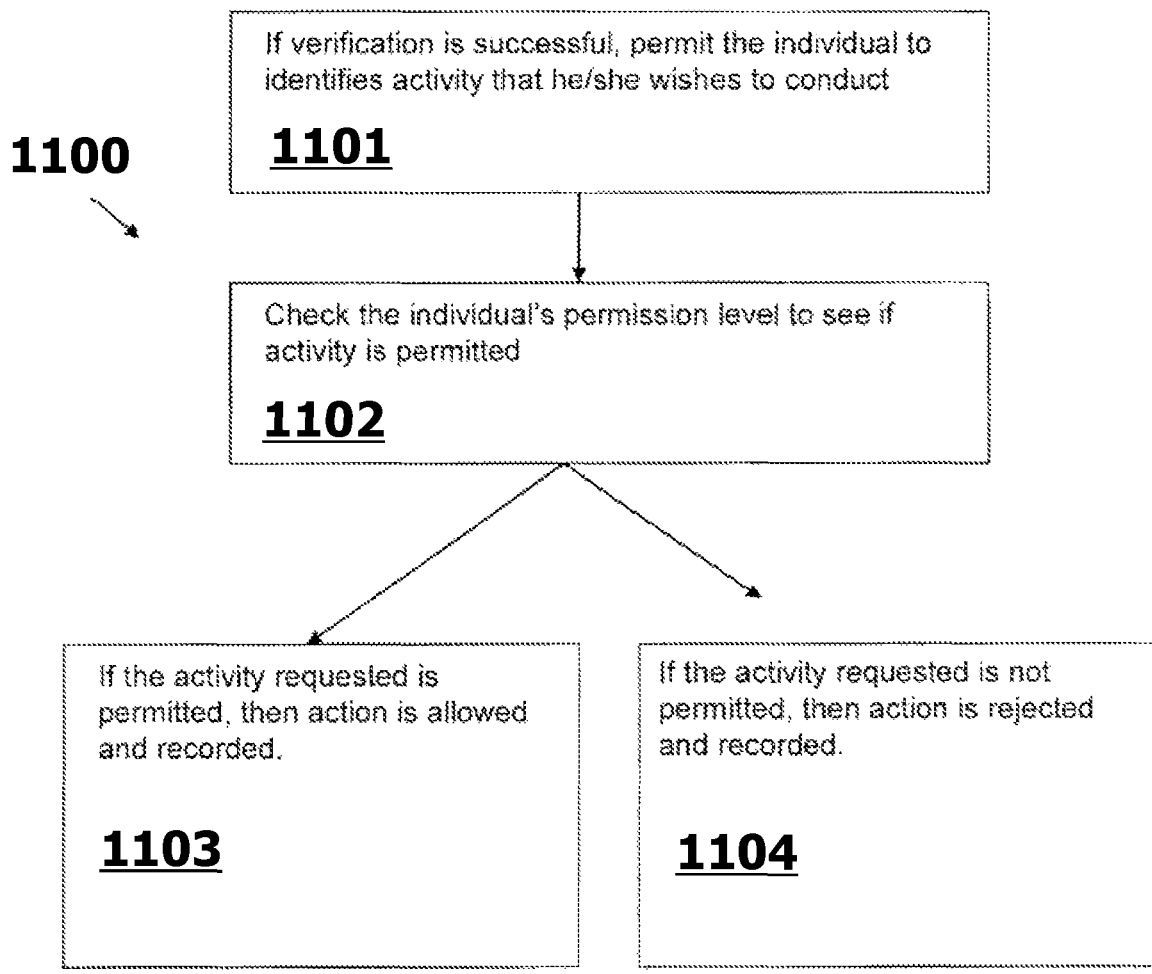

FIG. 9 illustrates an additional method 1100 designed to check an individual's permission level to determine whether a requested interaction is allowed. Once verification is successful (step 1003), the method 1100 permits the individual to request a particular interaction to conduct at step 1101 (e.g., placing a telephone call). The method 1100 then checks the verified individual's permission level to see if the requested activity is permitted (step 1102). If the interaction requested is permitted, the method 1100 permits the interaction and records the interaction at step 1103. If the activity requested is not permitted, then the interaction is rejected and the attempt is recorded at step 1104.

Figure 10:
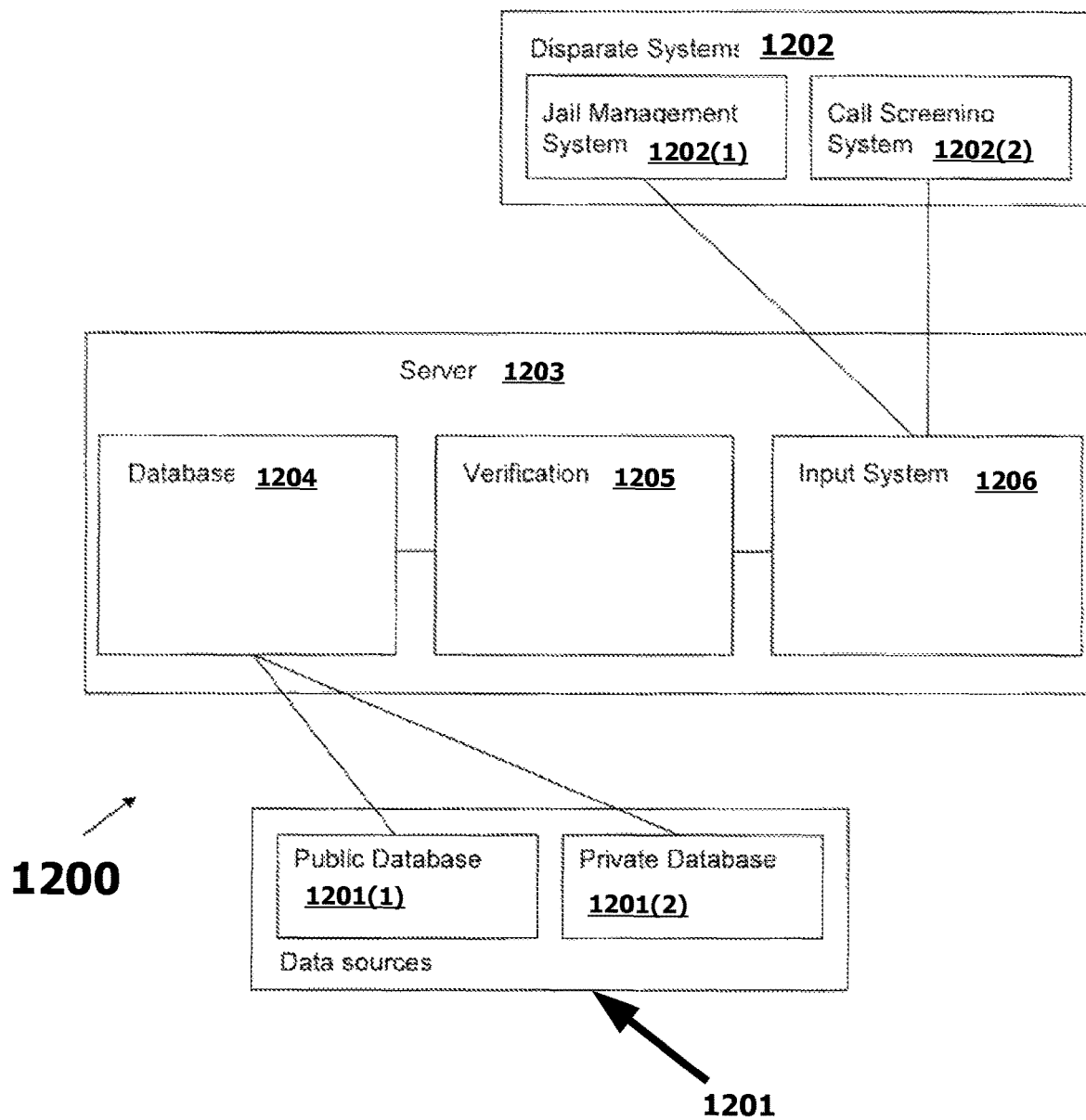

FIG. 10 is a diagram illustrating one embodiment of a system 1200 according to aspects of the present disclosure. The system 1200 includes a server 1203 comprising a database 1204, a verification system 1205, and an input system 1206. The server 1203 is programmed to perform one, all, or a combination of the methods 800, 900, 1100 disclosed herein. The database 1204 is populated with identity information from various data sources 1201, such as, a public database 1201(1) or a private database 1201(2). Public databases 1201(1) may include a line information database, best known name and address database, social security database, national financial information database, national passport database, government issued identification database, warrants database, national victim network database, or "do not contact" database. Private databases 1201(2) may include databases aggregated by the detention environment itself. In some cases the identity information from the data source 1201 existed prior to the individual's interaction with the individual subject to the detention environment. The database 1204 may also be populated by the data sources upon command, at intervals, or dynamically.

The system 1200 is preferably compatible with data sources 1201, such as e.g., the interactive audio/video system and device for use in a detention environment disclosed in U.S. patent application Ser. No. 13/088,883, the consolidated voicemail platform disclosed in U.S. patent application Ser. No. 12/826,168, an information exchange facilitating system such as e.g., the secure social network disclosed in U.S. patent application Ser. No. 13/438,940.

When an individual inputs information through one of the disparate systems 1202 for managing detention environment interactions, such as a jail management system 1202(1) or call screening system 1202(2), the server 1203 receives that information through its input system 1206. The verification system 1205 takes the information obtained through the input system 1206 and verifies the identifying information by matching it with the information stored in the database 1204.

In accordance with the practices of persons skilled in the art of computer programming, embodiments of the method 800, 900, 1100 are described with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits. Embodiments may also encompass integrated circuitry including circuit elements capable of performing specific system operations.

When implemented in a programmed device or system, the elements of the embodiments are essentially the code segments to perform the necessary tasks. The non-transitory code segments may be stored in a processor readable medium or computer readable medium, which may include any medium that may store or transfer information. Examples of such media include an electronic circuit, a semiconductor memory device, a read-only memory (ROM), a flash memory or other non-volatile memory, a floppy diskette, a CD-ROM, an optical disk, a hard disk, a fiber optic medium, etc. User input may include any combination of a keyboard, mouse, touch screen, voice command input, etc. User input may similarly be used to direct a browser application executing on a user's computing device to one or more network resources, such as web pages, from which computing resources may be accessed.

Now that some related environmental situations and systems have been described, the claimed embodiments and example methods for implementing a secure facility resident request system will now be further described.

Various embodiments of this disclosure provide for allowing residents to submit grievances, complaints, and other requests to facility staff, other residents, or service providers (such as doctors, lawyers, etc.) via electronic terminals already typically present in facilities.

When a resident desires to create a grievance or other request, he logs into an available telecommunications terminal, and using the touch-screen, selects the grievances application, selects a form that best matches the request or issue, and is then provided instructions for filling out the request form electronically. This process is further detailed via FIGS. 11-12.

Figure 11:
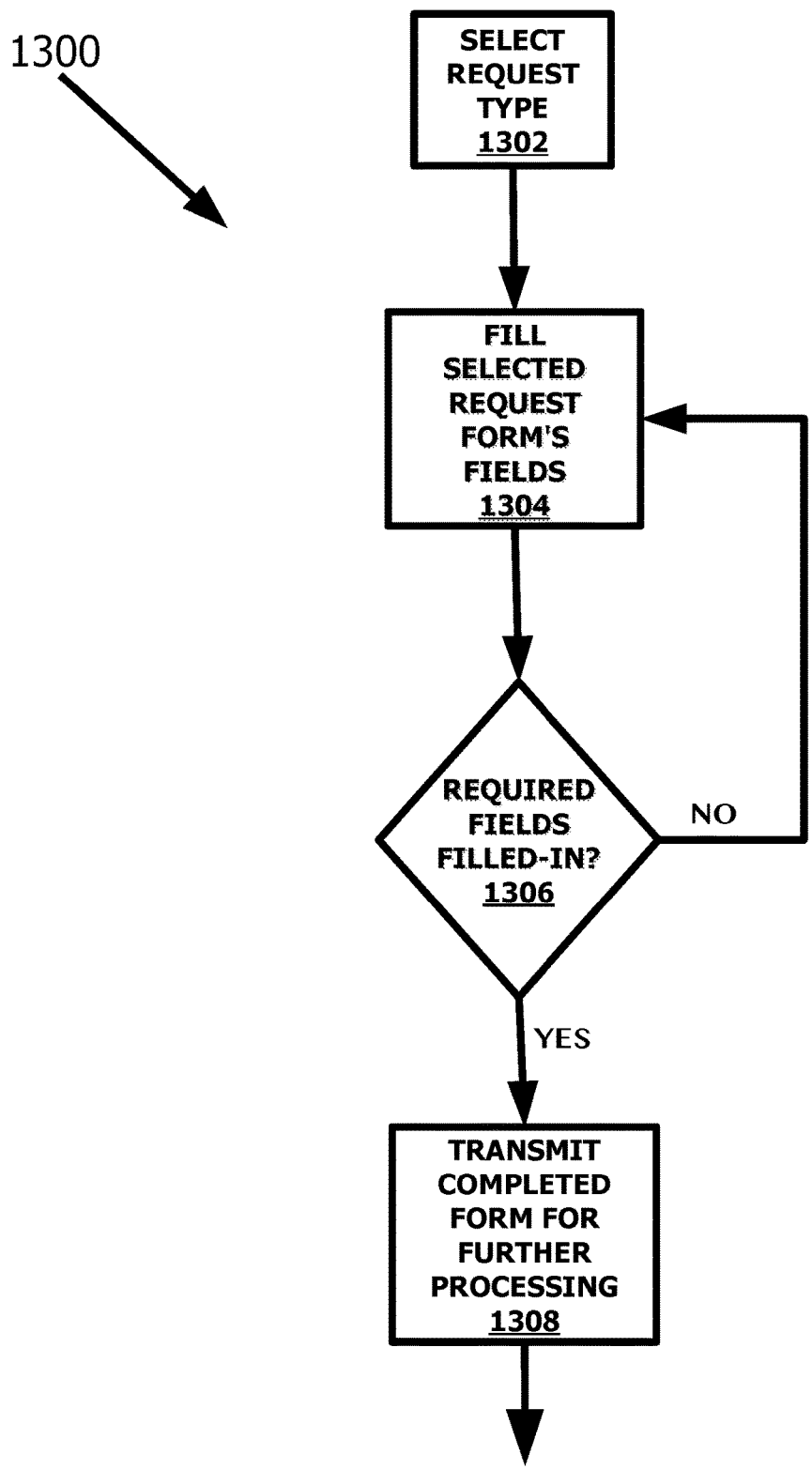
FIGS. 11-12 are flowchart diagrams that illustrate example methods for implementing a request system.

Starting with FIG. 11, a processor, such as a processor 402 of FIG. 4, may be used to execute method 1300 by having a resident select a request type (1302). Request types may be a grievance, medical request, or any other type of request as will be detailed further below. The processor 402 then has the resident fill the requested form's fields (1302), checks if required fields have been entered (1306) and further transmits the request for further processing (1308).

Figure 12:
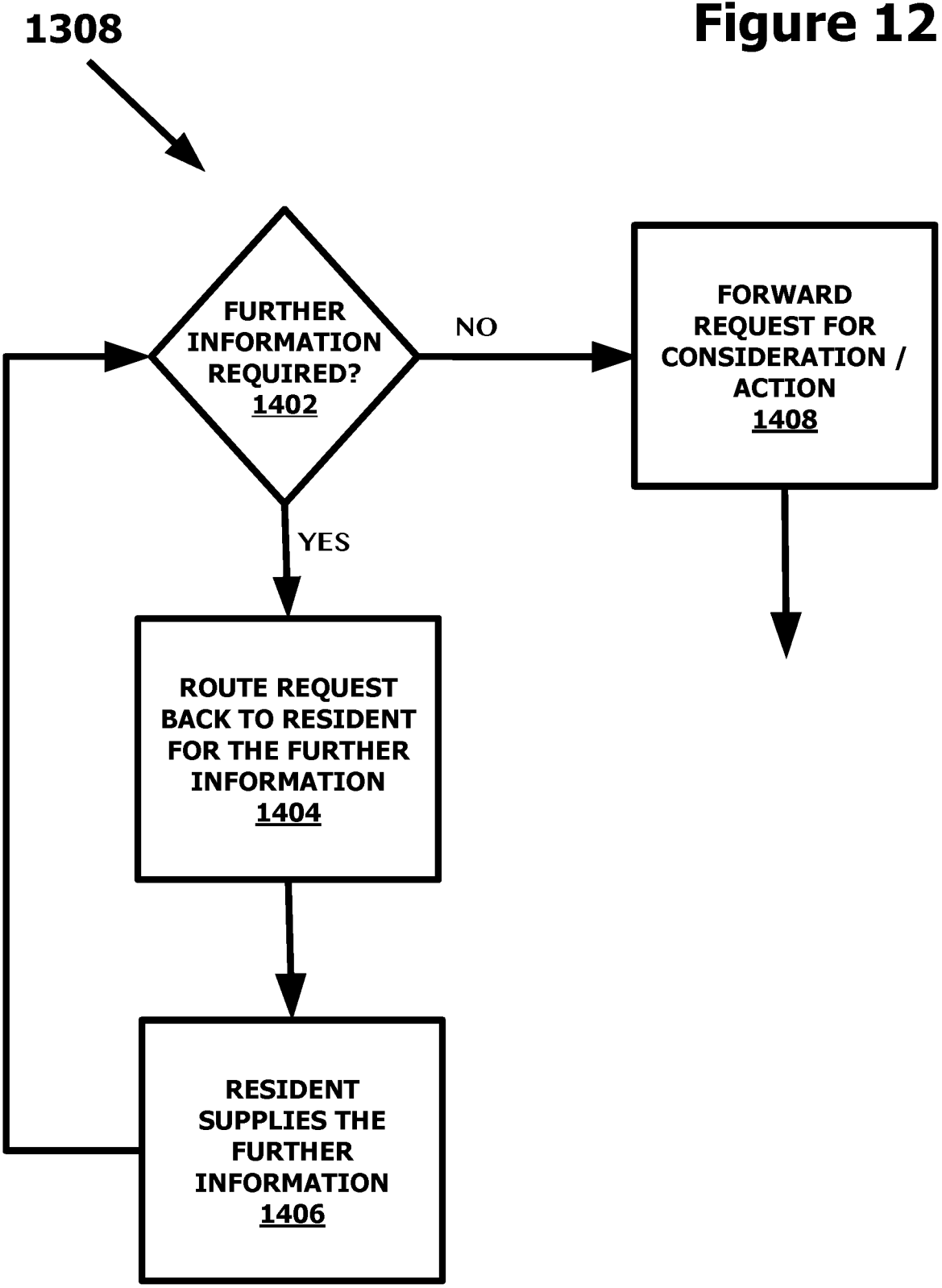

Further processing (1308) is detailed in FIG. 12 and involves processor 402 presenting the completed form to a staff member, or other appropriate personnel, to see if further information is required (1402). If yes, processor 402 routes the request back to the resident for the further information (1404) and has the resident supply the further information (1406). If no further information is required (1402), processor 402 forwards the request for consideration and possible action.

In an embodiment of a complaint-type request of one resident against another resident, the first resident may specify if a request is a complaint against a second resident. If so, he is presented with a photographic list of the other residents which reside in the same pod/area, or other pods which are allowed access to any rooms in common with the first resident's pod.

In an embodiment of a complaint-type request of one resident against a staff member, he is presented with a photographic list of the staff members, including correctional officers, which the resident might potentially come into contact with.

As the resident proceeds in the process of filling out the form, he may be, in some implementations, continually or perhaps semi-continually be notified by on-screen help text as to what additional information should be added or is required. Once complete, the resident is shown a preview of the entire submission, then given the opportunity to file the request or cancel it.

A grievance or request, once submitted, is stored in the system and made accessible to those who have been assigned permissions to review that specific form. For example, a nurse may be able to review medical grievances but not requests for public legal representation. Additionally, those who have access to grievances may elect to receive a copy of submitted grievances sent to their email address.

Staff members reviewing filed grievances may elect to reply to a grievance, such as asking additional questions, write an internal note for the grievance, such as noting that the resident has a pre-existing condition, forward the submitted grievance and any notes or responses associated with it to an outside email address, such as forwarding all details to a medical specialist, or the staff member may elect to mark the grievance as closed.

If the staff member replies to a grievance, the resident is able to view the original submission and all associated responses, similar to an email thread.

Upon the resident filing the request, the request system uses any selections of fellow residents or facility staff to ensure that contact between the first resident and any named residents or staff can be minimized until the nature of the request can be analyzed. Additionally, the request system determines which departments and/or staff members the request should be forwarded to, and ensures that none of the staff indicated in the request are allowed to interact with, view, or discover the existence of the complaint, so as to reduce the possibility of the first resident being intimidated or punished for filing a complaint against said staff member or other resident.

Before routing the request as determined above, the request system also analyzes the content of the request, looking for keywords that might indicate the request should be private, such as issues relating to medical care, legal advice, and other topics where privacy is desired or legally required. Such messages are then flagged for higher levels of privacy and can only be routed to a restricted set of staff members, who are authorized to handle such issues.

Optionally, these concerns may be avoided by having all, or perhaps certain types, grievances handled by persons not affiliated with the facility, such as customer service agents or other staff of the communications service provider, or staff at third-party companies or organizations not affiliated with either the facility or communications service provider, except through contractual service agreements. The security permissions settings in the invention allow administrators to create new user accounts and assign appropriate permissions to that account. This mechanism supports the secure creation of accounts for individuals outside the organization, if that is desired.

In some implementations, an auditable trail of activities is appended to the record, so that initial input, subsequent modifications, additions, responses, and status changes are logged as to when and where and by whom they were made. Every viewing of the record is also added to the audit trail. This audit trail can then be used by both facility staff and the resident should any disputes arise about the handling of the request.

Certain types of requests may have desired or legally required time limits in which specified actions or responses shall occur. Therefore, such messages are automatically flagged with the relevant deadline, and the system will alert facility staff when said response deadlines are looming and/or passed. Additionally, time sensitive responses may be highlighted or placed on top of a review queue to help ensure attention.

Any time the first resident logs into one of the telecommunications terminals, he is provided the opportunity to view any status updates concerning the status of requests he has filed.

The request system may also include a permission system to allow administrators to grant permissions allowing facility staff to create and edit grievance/request forms directly, and designates specific facility staff as potential recipients for submitted grievance forms. Alternately, the same permissions can be given to outside parties such as counselors, therapists, teachers, medical personnel or others working with the facility.

Once a facility staff member has permissions to create grievance forms, he or she may create both categories (like folders) and forms. For example, a "Medical" category might be created for all medical-related forms. Next a form for "Dental Issues" might be created and assigned to the "Medical" category. Creating categories and forms typically will have no direct dependencies and therefore very few constraints are placed on the form creator. There typically is no limit to the number of categories, forms or form fields that may be created in the system. Forms may be designated as "Published" or "Unpublished." Published forms are visible to correctional facility residents. Each form typically will also be assigned to one or more facility staff members for review.

Once a published category and form have been created, correctional facility residents are able to select a form to fill out, fill out the form, and submit it. For example, a resident might select the category "Medical," select a form titled "Dental Issues," fill out the form using a touchscreen station by typing with the onscreen keyboard, then submit the form by clicking the "Submit" button.

Once submitted by a resident, facility staff designated as form recipients will be able to view submitted information when logged into a web-based administration system. Those facility staff users with an email address will additionally receive a copy of submitted grievance forms in via email.

Facility staff members may reply to submitted forms (for example, they may reply with additional questions), they may add internal notes (for example, "this resident has previously tested positive for tuberculosis"), they may forward all information to an outside party via email (for example, a facility staff member may forward all submitted information with an oncologist of cancer is suspected), and a facility staff member may change the status of a submitted form as "Closed", indicating that no further action is intended.

When facility staff reply to submitted forms, the resident receives a message containing the response. All exchanged information (including the information in the original submitted form) is available to the resident. Additionally, the resident is notified when the submitted form is designated as "Closed."

While a number of exemplary aspects and embodiments have been discussed above, those of skill in the art will recognize certain modifications, permutations, additions and sub-combinations thereof. It is therefore intended that the following appended claims, and claims hereafter introduced, are interpreted to include all such modifications, permutations, additions and sub-combinations as are within their true spirit and scope.

What is claimed is:

1. A computer implemented method for processing a secure facility resident request using a secure facility call management system of a secure facility, the method comprising:

presenting, in a user interface of a secure facility resident application executing on a secure facility resident computing device, a field for a request type selection;

receiving, by the secure facility resident application, a request type selection in the field from a first secure facility resident;

presenting, in the user interface of the secure facility resident application, a request form corresponding to the request type to the first secure facility resident, wherein the request type is a grievance against a second secure facility resident;

determining a subset of a plurality of fellow secure facility residents from the plurality of fellow secure facility residents based on the subset and the first secure facility resident having access to a common room of the secure facility;

presenting images of the subset of the plurality of fellow secure facility residents from which the first secure facility resident may select as being the subject person of the grievance, wherein the subset of the plurality of fellow secure facility residents are subject to a plurality of physical restrictions that permit access to the common room of the secure facility;

receiving, in a plurality of fields of the user interface of the secure facility resident application, input for the request form from the first secure facility resident;

sending, by the secure facility resident application and via a network interface connection to a secure communication network, the request form to an administrator application executing on an administrator computing device, the secure communication network communicatively connecting the secure facility resident computing device and the administrator computing device,
wherein the request form is incomplete, preventing processing the secure facility resident request by secure facility staff, and
wherein a local server controls communication between the secure facility resident computing device and the administrator computing device by enforcing restrictions established by the administrator application based on an authentication of the first secure facility resident;

receiving, by the secure facility resident application from the secure communication network, the request form back to obtain further information;

receiving, in the plurality of fields of the user interface of the secure facility resident application, the further information from the first secure facility resident to generate an updated request form;

scanning, by a request system, the updated request form for a plurality of keywords to determine a topic of the updated request form;

flagging, by the request system, the updated request form as private based on the topic of the updated request form;

restricting, based on being flagged as private, routing of the updated request form to a restricted set of secure facility staff members; and sending, by the secure facility resident application via the network interface connection to the secure communication network, the updated request form to the administrator application thereby enabling the restricted set of secure facility staff members to review the updated request form.

2. The computer-implemented method as recited in claim 1 wherein a disinterested third party reviews the request form.

3. The computer-implemented method as recited in claim 1 wherein the grievance is a grievance against a secure facility staff member.

4. The computer-implemented method as recited in claim 3 further comprising presenting images of secure facility staff members from which the first secure facility resident may select as being the subject person of the grievance.

5. A non-transitory computer-readable medium, for processing a secure facility resident request using a secure facility call management system of a secure facility, comprising executable instructions operative to cause one or more processors to:

present, in a user interface of a secure facility resident application executing on a secure facility resident computing device, a field for a request type selection;

receive by the secure facility resident application, a request type selection in the field from a first secure facility resident;

present, in the user interface of the secure facility resident application, a request form corresponding to the request type to the first secure facility resident, wherein the request type is a grievance against a second secure facility resident;

determine a subset of a plurality of fellow secure facility residents from the plurality of fellow secure facility residents based on the subset and the first secure facility resident having access to a common room of the secure facility;

present images of the subset of the plurality of fellow secure facility residents from which the first secure facility resident may select as being the subject person of the grievance, wherein the subset of the plurality of fellow secure facility residents are subject to a plurality of physical restrictions that permit access to the common room of the secure facility;

receive, in a plurality of fields of the user interface of the secure facility resident application, input for the request form from the first secure facility resident;

send, by the secure facility resident application and via a network interface connection to a secure communication network, the request form to an administrator application executing on an administrator computing device, the secure communication network communicatively connecting the secure facility resident computing device and the administrator computing device, wherein the request form is incomplete, preventing processing the secure facility resident request by secure facility staff;

receive, by the secure facility resident application from the secure communication network, the request form back to obtain further information;

receive, in the plurality of fields of the user interface of the secure facility resident application, the further information from the first secure facility resident to generate an updated request form;

scan, by a request system, the updated request form for a plurality of keywords to determine a topic of the updated request form;

flag, by the request system, the updated request form as private based on the topic of the updated request form;

restrict, based on being flagged as private, routing of the updated request form to a restricted set of secure facility staff members; and send, by the secure facility resident application via the network interface connection to the secure communication network, the updated request form to the administrator application, thereby enabling the restricted set of secure facility staff members to review the updated request form.

6. The non-transitory computer-readable medium as recited in claim 5 wherein a disinterested third party reviews the request form.

7. The non-transitory computer-readable medium as recited in claim 5 wherein the grievance is a grievance against a secure facility staff member.

8. The non-transitory computer-readable medium as recited in claim 7 further comprising presenting images of secure facility staff members from which the first secure facility resident may select as being the subject person of the grievance.

9. A secure facility call management system of a secure facility for processing a secure facility resident request, the system comprising:

a secure facility resident computing device executing a secure facility resident application;

an administrator computing device of the secure facility, the administrator computing device executing an administrator application;

a request system;

a local server of the secure facility; and a secure communication network communicatively connecting the secure facility resident computing device and the administrator computing device via the local server, wherein the local server controls communication between the secure facility resident computing device and the administrator computing device by enforcing restrictions established by the administrator application based on an authentication of a first secure facility resident, wherein the secure facility resident application comprises instructions to cause the secure facility resident computing device to:

present, in a user interface of the secure facility resident application, a field for a request type selection;

receive a request type selection in the field from the first secure facility resident;

present, in the user interface of the secure facility resident application, a request form corresponding to the request type to the secure facility resident, wherein the request type is a grievance against another secure facility resident;

determine a subset of a plurality of fellow secure facility residents from the plurality of fellow secure facility residents based on the subset and the first secure facility resident having access to a common room of the secure facility;

present images of the subset of the plurality of fellow secure facility residents from which the first secure facility resident may select as being the subject person of the grievance, wherein the subset of the plurality of fellow secure facility residents are subject to a plurality of physical restrictions that permit access to the common room of the secure facility;

receive, in a plurality of fields of the user interface, input for the request form from the first secure facility resident;

send, via a network interface connection to a secure communication network, the request form to the administrator application, wherein the request form is incomplete, preventing processing the secure facility resident request by secure facility staff;

receive, from the secure communication network, the request form back to obtain further information;

receive, in the plurality of fields of the user interface, the further information from the first secure facility resident to generate an updated request form; and send the updated request form to the administrator application via the secure communication network, thereby enabling a restricted set of secure facility staff members to review the updated request form, and wherein, prior to routing, the request system is configured to:

scan, by a request system, the updated request form for a plurality of keywords to determine a topic of the updated request form;

flag, by the request system, the updated request form as private based on the topic of the updated request form; and restrict, based on being flagged as private, routing of the updated request form to the restricted set of secure facility staff members.

10. The system as recited in claim 9 wherein a disinterested third party reviews the request form.

11. The system as recited in claim 9 wherein the grievance is a grievance against a secure facility staff member.

12. The system as recited in claim 11 further comprising presenting images of secure facility staff members from which the first secure facility resident may select as being the subject person of the grievance.

* * * * *